(12) United States Patent
Maekawa et al.

(10) Patent No.: US 7,975,589 B2
(45) Date of Patent: Jul. 12, 2011

(54) SCRIBING WHEEL FOR BRITTLE MATERIAL AND MANUFACTURING METHOD FOR SAME, AS WELL AS SCRIBING METHOD, SCRIBING APPARATUS AND SCRIBING TOOL USING THE SAME

(75) Inventors: Kazuya Maekawa, Suita (JP); Haruo Wakayama, Suita (JP)

(73) Assignee: Mitsuboshi Diamond Industrial Co., Ltd., Osaka (JP)

(*) Notice: Subject to any disclaimer, the term of this patent is extended or adjusted under 35 U.S.C. 154(b) by 460 days.

(21) Appl. No.: 11/988,193

(22) PCT Filed: Jul. 6, 2006

(86) PCT No.: PCT/JP2006/313508
§ 371 (c)(1),
(2), (4) Date: Jan. 24, 2008

(87) PCT Pub. No.: WO2007/004700
PCT Pub. Date: Jan. 11, 2007

(65) Prior Publication Data
US 2009/0078105 A1    Mar. 26, 2009

(30) Foreign Application Priority Data
Jul. 6, 2005    (JP) .................................. 2005-227207

(51) Int. Cl.
B26F 3/00    (2006.01)
(52) U.S. Cl. ................................. 83/886; 225/2; 225/96
(58) Field of Classification Search .......... 225/2, 94–96; 83/51, 879, 884–887
See application file for complete search history.

(56) References Cited

U.S. PATENT DOCUMENTS

| | | | | |
|---|---|---|---|---|
| 3,074,143 A | | 1/1963 | Smith | |
| 3,286,893 A | * | 11/1966 | Zellers, Jr. | 225/2 |
| 3,800,991 A | * | 4/1974 | Grove et al. | 225/2 |
| 3,956,547 A | * | 5/1976 | DeTorre | 428/43 |
| 4,137,803 A | * | 2/1979 | Goldinger | 83/881 |
| 4,140,820 A | * | 2/1979 | DeTorre | 427/292 |
| 4,331,273 A | * | 5/1982 | Hyatt | 225/2 |
| 5,836,229 A | * | 11/1998 | Wakayama et al. | 83/886 |
| 6,796,212 B2 | * | 9/2004 | Maekawa et al. | 83/886 |
| 7,523,846 B2 | * | 4/2009 | Takamatsu et al. | 225/2 |
| 7,717,311 B2 | * | 5/2010 | Nishio | 225/2 |
| 2002/0038594 A1 | | 4/2002 | Mackawa et al. | |
| 2004/0123717 A1 | * | 7/2004 | Maekawa et al. | 83/880 |
| 2008/0022834 A1 | | 1/2008 | Wakayama et al. | |

FOREIGN PATENT DOCUMENTS

| | | |
|---|---|---|
| EP | 1 179 512 | 2/2002 |
| EP | 1 386 891 | 2/2004 |
| EP | 1 779 988 | 5/2007 |
| JP | 5-254865 | 10/1993 |
| JP | 2000-219527 | 8/2000 |

(Continued)

*Primary Examiner* — Boyer D. Ashley
*Assistant Examiner* — Edward Landrum
(74) *Attorney, Agent, or Firm* — Jordan and Hamburg LLP

(57) ABSTRACT

A scribing wheel for a brittle material includes a circumferential ridgeline in which two truncated cones have connected bottoms so as to share a rotational axis. Alternating notches and protrusions are formed along the circumference ridgeline. The protrusion are portions of the ridgeline remaining after the ridgeline is notched. The length of the notches is less than that of the protrusions so that a catch on the surface is improved while lowering the high penetrability.

9 Claims, 15 Drawing Sheets

FOREIGN PATENT DOCUMENTS

| WO | WO-2004/048058 | 6/2004 |
| WO | WO2004048058 A1 * | 6/2004 |
| WO | WO-2004/067243 | 8/2004 |
| WO | WO-2004/082906 | 9/2004 |

* cited by examiner (Location with central line average roughness Ra)

PRIOR ART

PRIOR ART

PRIOR ART

PRIOR ART

PRIOR ART

PRIOR ART

SCRIBING WHEEL FOR BRITTLE MATERIAL AND MANUFACTURING METHOD FOR SAME, AS WELL AS SCRIBING METHOD, SCRIBING APPARATUS AND SCRIBING TOOL USING THE SAME

TECHNICAL FIELD

The present invention relates to a scribing wheel for brittle materials which is rotated in such a state as to be pressed against a brittle material substrate so that a scribe line is drawn on the above described brittle material substrate, and thus, a vertical crack which extends in the direction of the thickness of the above described brittle material substrate is formed from the above described scribe line, and a manufacturing method for the same, as well as a method and an apparatus for scribing a brittle material substrate using the above described scribing wheel.

BACKGROUND TECHNOLOGY

A substrate made of a brittle material (hereinafter referred to as substrate) having a size corresponding to a screen size is used for a flat panel display (hereinafter referred to as FPD).

In terms of panels for a liquid crystal display, which is a type of FPD, for example, two glass substrates are pasted together and liquid crystal is injected into the gap between these, and thus, a display panel is formed. In addition, in the case of a reflective type substrate inside a substrate for a projector, referred to as LCOS, a pair of substrates where a crystal substrate and a semiconductor wafer are pasted together is used. A pasted substrate where substrates are pasted together as described above is divided into unit substrates of a predetermined size, usually by drawing scribe lines on the surface of the pasted substrate, which is a mother substrate having a large size, and then breaking the substrate along the drawn scribe lines.

Here, drawing of scribe lines on a mother substrate is referred to as "scribing." Folding and breaking of a mother substrate along a scribe line drawn through scribing is referred to as "breaking." Dividing of a mother substrate into a brittle material substrate of a desired size through scribing and breaking is referred to as "dividing." Furthermore, separation of a brittle material substrate that has been divided and conveyed after a dividing process into individual substrates is referred to as "separating."

In addition, the properties of a scribing wheel for extending a vertical crack in the direction of the thickness of the substrate from the surface of the substrate by drawing a scribe line are referred to as "penetrability."

FIG. 7 is a front diagram showing a publicly known scribing apparatus.

A conventional scribing method is described in reference to FIG. 7. Here, in this diagram, the left-right direction is the X direction and the direction perpendicular to the surface of the paper is the Y direction, in the following description.

A scribing apparatus 100 is provided with a table 28 on which a mounted glass substrate G is secured by means of a vacuum suction means and which is rotatable horizontally, a pair of guide rails 21, 21 which are parallel to each other and support the table 28 in such a manner that the table 28 can move in the Y direction, a ball screw 22 for moving the table 28 along the guide rails 21, 21, a guide bar 23 which crosses above the table 28 in the X direction, a scribe head 1 which is provided on the guide bar 23 in such a manner as to be slidable in the X direction and provides pressure for cutting to a scribing wheel 50, a motor 24 for sliding the scribe head 1 along the guide bar 23, a chip holder 11 which is provided at the lower end of the scribe head 1 in such a manner as to be able to freely oscillate and is raised and lowered by the scribe head 1, a scribing wheel 50 which is mounted at the lower end of the chip holder 11 in such a manner as to be rotatable, and a pair of CCD cameras 25 which are installed above the guide bar 23 and recognize alignment marks formed on the glass substrate G on the Table 28.

FIGS. 8 and 9 are diagrams illustrating the process for dividing a brittle material substrate, for example a glass substrate, that is to say, the respective steps of drawing a scribe line on the surface of a brittle material substrate and breaking the brittle material substrate along the drawn scribe line so that the substrate is divided into brittle material substrates of a desired size.

In reference to FIGS. 8 and 9, two examples of the process for dividing a substrate are described. Here, in the following description, a glass substrate G, which is pasted glass used for a panel for a liquid crystal display, is used as an example, and for the sake of convenience, the glass substrate on one side is referred to as substrate on side A and the glass substrate on the other side is referred to as substrate on side B for the time being.

In the first example, (1) first, as shown in FIG. 8(a), a glass substrate G is mounted on the scribe table of the scribing apparatus with the substrate on side A facing upward, and the substrate on side A is scribed using the scribing wheel 50 so that a scribe line Sa is drawn.

(2) Next, the glass substrate G is turned upside down and the above described glass substrate G is conveyed to a breaking apparatus. Then, as shown in FIG. 8(b), a breaking bar 3 is pressed against the substrate on side B of the glass substrate G mounted on a mat 4 along the line facing the scribe line Sa in this breaking apparatus. As a result, a crack extends upward from the scribe line Sa in the lower side substrate on side A, and thus, the substrate on side A is divided along the scribe line Sa.

(3) Next, the glass substrate G is conveyed onto the scribing table of the scribing apparatus. Then, in this scribing apparatus, as shown in FIG. 8(c), the substrate on side B is scribed using the scribing wheel 50 so that a scribe line Sb is drawn.

(4) Next, the glass substrate G is turned upside down and conveyed to the breaking apparatus. Then, as shown in FIG. 8(d), the breaking bar 3 is pressed against the substrate on side A of the above described glass substrate G mounted on the mat 4 along the line facing the scribe line Sb. As a result, the crack extends upward from the scribe line Sb on the lower side substrate on side B, and the substrate on side B is divided along the scribe line Sb.

In the present invention, the dividing method made up of the above steps is referred to as SBSB method (S means scribing, and B means breaking).

In addition, in the second example, (1) first, as shown in FIG. 9(a), a glass substrate G is mounted on the scribe table of the scribing apparatus with the substrate on side A facing upward, and the substrate on side A is scribed using the scribing wheel 50 so that a scribe line Sa is drawn.

(2) Next, the glass substrate G is turned upside down, the above described glass substrate G is mounted on the scribing table, and the glass substrate on side B is scribed using the scribing wheel 50 so that a scribe line Sb is drawn (FIG. 9(b)).

(3) Next, the glass substrate G is conveyed to a breaking apparatus. Then, as shown in FIG. 9(c), the breaking bar 3 is pressed against the glass substrate on side B of the glass substrate G mounted on the mat 4 along the line facing the scribe line Sa in this breaking apparatus. As a result, the crack extends upward from the scribe line Sa on the lower side substrate on side A, and the substrate on side A is divided along the scribe line Sa.

(4) Next, the glass substrate G is turned upside down and, as shown in FIG. 9(d), mounted on the mat 4 in the breaking apparatus. Then, the breaking bar 3 is pressed against the substrate on side A of the glass substrate G along the line facing the scribe line Sb. As a result, the crack extends upward from the scribe line Sb on the lower side substrate on side B, and the substrate on side B is divided along the scribe line Sb.

In the present invention, the dividing method made up of the above described steps is referred to as SSBB method.

By carrying out the respective steps (1) to (4) in the two above described examples, a glass substrate G is divided in two along a scribe line in a desired location. Furthermore, the glass substrate G is separated at desired locations for separation through application of light force.

In addition, Patent Document 1 discloses a scribing wheel having high penetrability.

Patent Document 1: Japanese Patent No. 3,074,143

FIGS. 11 and 12 are schematic diagrams (including a diagram showing an enlargement of a certain portion) for illustrating the scribing wheel of Patent Document 1.

A scribing wheel 40 is formed of an outer peripheral portion around which a circumference ridgeline 41 is formed, and a great number of alternating notches 40b and protrusions 40a formed along the circumference ridgeline 41 in the direction of the circumference. The protrusions 40a are formed by notching the circumference ridgeline 41 with a predetermined pitch and depth. A vertical crack which is deep relative to the thickness of the glass substrate can be formed in the glass substrate from the surface in the vertical direction by drawing a scribe line using the scribing wheel 40. In the case where such a scribing wheel 40 having high penetrability is used in the dividing process, it becomes possible to simplify or omit the breaking process in accordance with the SBSB method shown in FIGS. 8(b) and 8(d), or the breaking process in accordance with the SSBB method shown in FIGS. 9(c) and 9(d).

Furthermore, as a result of improvements in the material for substrates by makers of glass materials and various types of improvements in heat treatment, a state of "poor catch" may ensue, that is to say, there may be cases where scribe lines do not start being drawn immediately after the rotation of the wheel at the time of scribing using a conventional cutter wheel (conventional blade (normal blade); hereinafter referred to as N blade). That is to say, it has been observed that the blade tends to "easily slip" on the surface of the substrate. As a result of this, blades with "good catch" have started being required. However, it is possible for the blade with high penetrability (hereinafter referred to as P blade) described in Patent Document 1 to provide "good catch" but it has become difficult to secure the quality standard in terms of the strength of the end surface required at the manufacturing site for FPD panels. Though in terms of the strength the end surface, data on surfaces divided using an N blade is favorable, there are the following problems described in reference to FIG. 10 in the case of N blades.

FIG. 10 is a schematic diagram showing a case of cross scribing on a single substrate. There are problems in the case where such a cross scribing method using an N blade is employed, such that scribe lines do not continue in the vicinity of intersections and so-called "intersection skipping" may occur.

Though in terms of the above described strength of the end surface, data on surfaces divided using an N blade is favorable, there are problems, such that (1) intersection skipping occurs in cross scribing, (2) good catch is required for substrates having a high level of hardness on the surface, and (3) though a scribing method using inner cutting is required for glass having a thickness of 0.4 mm or less and glass of which the thickness has been reduced through chemical treatment, for example chemical etching, N blades cannot cope with this.

Meanwhile, in the case where it is desired for a scribing method using a P blade to be adopted, some sites of mass production for FPD panels require tasks that can be dealt with in conventional breaking processes, in which case introduction of a P blade does not necessarily become a solution. In addition, in terms of the strength of the end surface, use of a P blade is in some cases restricted.

Though the number of cases where a mother substrate which is a material for a panel substrate is chemically etched in order to reinforce the strength on the surface of the substrate in addition to improvement of the surface strength of substrates has been increasing, in such cases, the outer periphery of the substrate bulges and the scribing operation through "outer cutting" (outer cutting scribing operation) tends to become unstable. In addition, there has been a rising tendency of panel substrates used for portable terminals, such as cellular phones, becoming thinner and thinner with reduction in weight as a purpose, and problems arise with such substrates when an outer cutting scribing method using an N blade is adopted. The reason for this is that when an outer cutting scribing method is adopted for a thin substrate, impacts at the edge of the end surface of the substrate may cause chipping at the edge or cracking of the substrate itself when the cutter wheel rolls onto the substrate, and thus, the yield of products lowers. Accordingly, outer cutting scribing using an N blade cannot be adopted for thin substrates. However, N blades are blades with poor catch, and therefore, an inner cutting scribing method using such a blade cannot be adopted.

For the reasons described above, the user of the blade has required a blade having good catch on the surface of substrates, that is to say, a blade which makes it difficult for intersection skipping to occur and can secure quality for the end surface, so that the strength is approximately the same as that of N blades.

DISCLOSURE OF THE INVENTION

Problem to be Solved by the Invention

In the case where a glass substrate G is divided using the above described scribing apparatus 100, the table 28 on which the glass substrate is mounted is rotated by 90°, and thus, cross scribing is carried out longitudinally and laterally, so that a number of scribe lines are drawn on the glass substrate, not only in one direction but also crosswise, and intersections are formed.

As shown in FIG. 10, when the scribing wheel 50 passes through the initially drawn scribe lines L1 to L3 so as to draw scribe lines L4 to L6, a phenomenon can in some cases be observed, where the latter drawn scribe lines L4 to L6 are partially not formed in the vicinity of the intersections of these scribe lines (this phenomenon is referred to as "intersection skipping").

When such intersection skipping occurs on a glass substrate, in many cases, the glass substrate is not separated along the scribe lines, and as a result, a large amount of defects are caused, and a problem arises, such that the efficiency in production significantly deteriorates.

The cause of intersection skipping is considered to be as follows. That is to say, when a scribe line is initially drawn with an N blade, internal stress is caused in the vicinity of the surface of the glass on both sides of the scribe line. Next, the scribing wheel with an N blade passes through the initially drawn scribe line, the internal stress latent in the vicinity weakens the force required for scribing which is applied on the surface of the glass substrate by the scribing wheel in the vertical direction, and as a result, it is considered that scribe lines to be drawn later end up not being formed in the vicinity of intersections.

Meanwhile, in the case where scribe lines are drawn using a scribing wheel 40 (P blade) with high penetrability as that shown in Patent Document 1, the above described intersection skipping in cross scribing can be prevented, so that a deep vertical crack can be formed on the surface of the glass substrate.

In the case where scribe lines are drawn using the scribing wheel 40, however, as shown in FIG. 8(c), a deep vertical crack is formed on the upper side substrate on side B at the point in time when this substrate on side B is scribed, and in some cases, the state becomes such that the glass substrate G is substantially separated. Therefore, when the glass substrate G is sucked with a suction pad or the like and conveyed to a second breaking apparatus so as to shift from FIG. 8(c) to FIG. 8(d), in some cases, one of the separated portions of the glass substrate G is left in the second scribing apparatus, or one of the separated portions of the glass substrate G drops while the glass substrate G is being conveyed. In addition, the quality of the divided surface (strength on the end surface) of the brittle material is sometimes low in comparison with the case where a conventional scribing wheel (N blade) is used.

The present invention is provided in view of these problems with the prior art, and an object of the invention is to provide a scribing wheel for a brittle material which makes it possible to prevent intersection skipping when a brittle material substrate is cut, and prevent portions of a substrate from dropping while the substrate is stably conveyed, as well as a method, apparatus and tool for scribing a brittle material substrate using the same.

In addition, an object of the present invention is to provide a scribing wheel which has good catch at the time of scribing operation, and such scribing performance as to provide excellent quality on the divided surface (strength on the end surface) of brittle materials, as well as a method, apparatus and tool for scribing a brittle material substrate using the same.

Means for Solving Problem

The present invention provides a scribing wheel for a brittle material comprising: an outer peripheral portion around which a circumference ridgeline is formed, where two truncated cones have connected bottoms so as to share the same rotational axis; and a number of alternating notches and protrusions which are formed in the direction of the circumference along said circumference ridgeline, wherein the above described protrusions are formed of portions of the above described circumference ridgeline which remain after the above described circumference ridge line is notched and have a length in the direction of the circumference so that a scribe line is drawn on the above described brittle material substrate and a vertical crack extending from the scribe line in the direction of the thickness of a brittle material substrate is formed when the scribing wheel is rotated in such a state as to be pressed against the above described brittle material substrate, characterized in that the length of the above described notches in the direction of the circumference is in a range from 4 μm to 14 μm, preferably from 7 μm to 12 μm.

Protrusions in the present invention are formed of portions of the circumference ridgeline having a length in the direction of the circumference which are left after the circumference ridgeline of an N blade, which is a conventional blade, is notched.

When a brittle material substrate is cut, the following configuration is preferable, in order to prevent intersection skipping, prevent the quality on the divided surface of the glass substrate after separation from lowering, prevent portions of the substrate from dropping, thus making it possible for the substrate to be stably conveyed, and increase the quality on the divided surface (strength on the end surface) of a brittle material.

That is to say, the length of the above described notches in the direction of the circumference is shorter than the length of the above described protrusions in the direction of the circumference. The above described outer peripheral portion is formed so as to include the inclined surfaces of the two above described cones, and the central line average roughness Ra of the above described inclined surfaces is 0.45 μm or less. The central line average roughness Ra of the above described circumference ridgeline is 0.40 μm or less.

Here, the scribing wheel for a brittle material according to the present invention includes an integrated type scribing wheel for a brittle material, which is in disc form with a hole for an axis through which a pin for supporting the above described wheel around the axis passes, and with which a portion corresponding to the above described pin is integrally formed.

Another aspect of the present invention provides a method for scribing a brittle material according to which a scribing wheel for a brittle material is rotated in such a state as to be pressed against a brittle material substrate so that a scribe line is drawn on the above described brittle material substrate, characterized in that a first scribe line is drawn using a first scribing wheel, and then, a second scribe line which crosses the drawn first scribe line is drawn using a second scribing wheel, and at least the first scribing wheel is the scribing wheel for a brittle material according to the present invention.

At least the first scribing wheel is the scribing wheel for a brittle material according to the present invention, and the second scribing wheel may be a scribing wheel not having the same high penetrability as the first scribing, or a scribing wheel having the same high penetrability as that described above.

Another aspect of the present invention provides an apparatus for scribing a brittle material comprising: a rotatable table on which a brittle material substrate is mounted; a portion for attachment of a scribing wheel which moves in the X and Y direction relative to the brittle material substrate mounted on the above described rotatable table; and the scribing wheel for a brittle material according to the present invention, which is attached to the above described portion for attachment of a scribing wheel.

Still another aspect of the present invention provides a manual tool for scribing a brittle material, wherein the scribing wheel for a brittle material according to the present invention is attached to a holder provided at an end of a handle in such a manner as to be freely rotatable around the axis.

Yet another aspect of the present invention provides a method for manufacturing a scribing wheel for a brittle material comprising: an outer peripheral portion around which a circumference ridgeline is formed, where two truncated cones have connected bottoms so as to share the same rotational axis; and a number of alternating notches and protrusions which are formed in the direction of the circumference along the above described circumference ridgeline, wherein the above described protrusions are formed of portions of the above described circumference ridgeline which remain after the above described circumference ridge line is notched and have a length in the direction of the circumference so that a scribe line is drawn on the above described brittle material substrate and a vertical crack extending from the scribe line in the direction of the thickness of a brittle material substrate is formed when the scribing wheel is rotated in such a state as to be pressed against the above described brittle material substrate, characterized in that a step of forming a notch having a V shape as viewed in the direction of the axis line of the above described cones by notching the outer peripheral portion through irradiation with a laser beam is provided in such a manner that the length of the above described notch in the direction of the circumference is set by changing the center angle of the above described V shape.

Still yet another aspect of the present invention provides a method for manufacturing a scribing wheel for a brittle material comprising: an outer peripheral portion around which a circumference ridgeline is formed, where two truncated cones have connected bottoms so as to share the same rotational axis; and a number of alternating notches and protrusions which are formed in the direction of the circumference along the above described circumference ridgeline, wherein the above described protrusions are formed of portions of the above described circumference ridgeline which remain after the above described circumference ridge line is notched and have a length in the direction of the circumference so that a scribe line is drawn on the above described brittle material substrate and a vertical crack extending from the scribe line in the direction of the thickness of a brittle material substrate is formed when the scribing wheel is rotated in such a state as to be pressed against the above described brittle material substrate, characterized in that a step of forming a notch having a trapezoid shape as viewed in the direction of the axis line of the above described cones by notching the outer peripheral portion through irradiation with a laser beam is provided in such a manner that the length of the above described notch in the direction of the circumference is set by changing the length of the bottom side of the trapezoid shape.

EFFECTS OF THE INVENTION

In the scribing wheel for a brittle material according to the present invention, the length of the notches in the direction of the circumference is shorter than the length of the protrusions in the direction of the circumference, and therefore, the bite (catch) on the surface of glass can be improved while lowering the above described high penetrability.

In the scribing wheel for a brittle material according to the present invention, the length of the notches in the direction of the circumference is in a range from 4 μm to 14 μm, and therefore, when a brittle material is cut, intersection skipping can be prevented, the quality on the divided surface of the glass substrate after separation can be prevented from deteriorating, and portions of the substrate can be prevented from dropping while the substrate is conveyed, thus making stable conveyance possible.

The outer peripheral portion is formed so as to include the inclined surfaces of two truncated cones where the central line average roughness Ra of the inclined surfaces is 0.45 μm or less, and therefore, the surface roughness on the inclined surfaces of the two truncated cones can be kept low. The surface roughness on the inclined surfaces of the truncated cones is transcribed onto the edge portion of glass through scribing, and the surface roughness on the inclined surfaces of the truncated cones is kept low, and therefore, strength can be secured in the edge portion of glass (strength on the end surface), and thus, the quality on the divided surface of the glass substrate after separation can be prevented from deteriorating.

The circumference ridge line has microscopic unevenness in the direction of the diameter of the disc, and the central line average roughness Ra of the above described unevenness is 0.40 μm or less, and therefore, the tip of the protrusions along the circumference ridge line can be prevented from undulating, and thus, a stable scribe line can be drawn.

In accordance with the method for scribing a brittle material according to the present invention, the scribing wheel for a brittle material according to the present invention is used as a first scribing wheel for drawing initial scribe lines when cross scribing is carried out, and therefore, the quality on the divided surface of the brittle material substrate after separation can be prevented from lowering, and portions of the brittle material can be prevented from dropping while the brittle material is conveyed after cross scribing, thus making stable conveyance possible.

In the apparatus for scribing a brittle material according to the present invention, the scribing wheel for a brittle material according to the present invention is mounted, and thus, intersection skipping can be prevented when a brittle material is cut, and the quality on the divided surface of the glass substrate after separation can be prevented from lowering, and portions of the substrate can be prevented from dropping while the substrate is conveyed, thus making stable conveyance possible.

The method for manufacturing a scribing wheel for a brittle material according to the present invention is provided with a step of forming notches having a V shape as viewed in the direction of the axis line of the above described cones by notching the outer peripheral portion through irradiation with a laser beam, and the length of the above described notches in the direction of the circumference can be set by changing the center angle of the above described V shape, and therefore, the length of the notches can be changed while keeping the depth of the notches constant.

The method for manufacturing a scribing wheel for a brittle material according to the present invention is provided with a step of forming notches having a trapezoid shape as viewed in the direction of the axis line of the above described cones by notching the outer peripheral portion through irradiation with a laser beam, and the length of the above described notches in the direction of the circumference can be set by changing the length of the bottom side of the above described trapezoid shape, and therefore, the length of the notches can be changed while keeping the depth of the notches constant.

Figure 1:
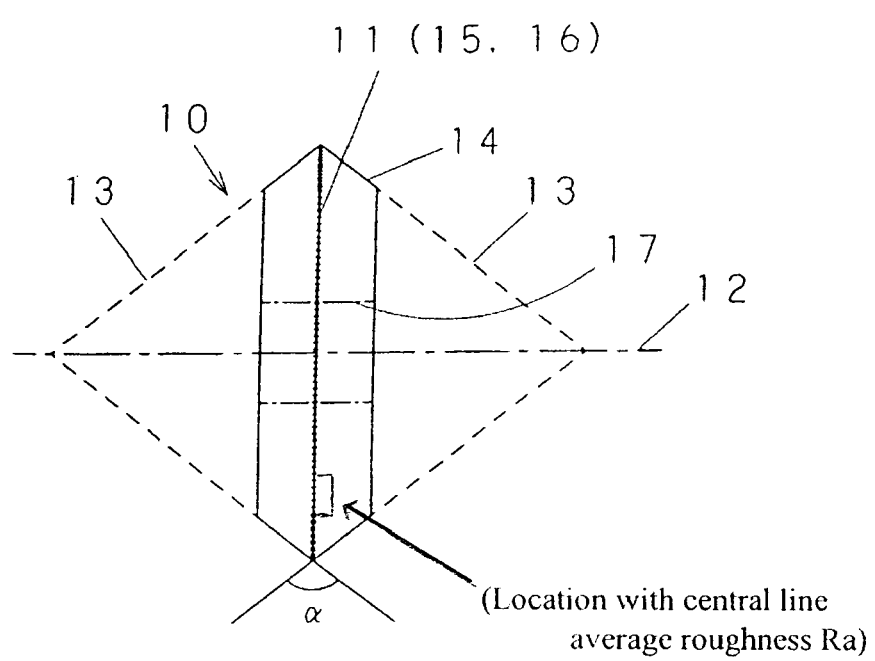
FIG. 1 is a front diagram showing the scribing wheel according to the present invention as viewed in the direction perpendicular to the rotational axis.

EXPLANATION OF SYMBOLS 1 scribing head
10 scribing wheel
11 circumference ridgeline
15 notches
16 protrusions
60 scribing wheel
61 circumference ridgeline
70 scribing wheel
71 circumference ridgeline
75 notches
76 protrusions
90 manual scribing tool

BEST MODE FOR CARRYING OUT THE INVENTION

In the following, the embodiments of the present invention are described in detail in reference to the drawings.

Here, the form, the quality of the material, the applications and the dimensions of the brittle material substrate which is an object to be processed according to the present invention are not particularly limited, and may be a substrate made of a single plate, a pasted substrate where two or more single plates are pasted together, or a substrate where a thin film or a semiconductor material adheres on the surface or inside or is included in these. Here, even in the case where a thin film or the like adheres on the surface, a brittle material substrate as that described above may be an object to be scribed with the scribing wheel according to the present invention.

As the material for the brittle material substrate in the present invention, glass, ceramic, semiconductor (silicon and the like), sapphire and the like can be cited, and as the application thereof, panels for a flat panel display, such as panels for field emission display (FED), including plasma display panels, organic EL display panels and surface-conduction electron-emitter display (SED) panels, can be cited.

"Central line average roughness Ra" in the present invention is one of the parameters indicating the surface roughness of industrial products prescribed under JIS B 0601, and is an arithmetic average value randomly taken from the surface of an object.

In the following embodiments, examples relating to the form of the scribing wheel according to the present invention are shown, but the scribing wheel according to the present invention is not limited to these.

Figure 2A:
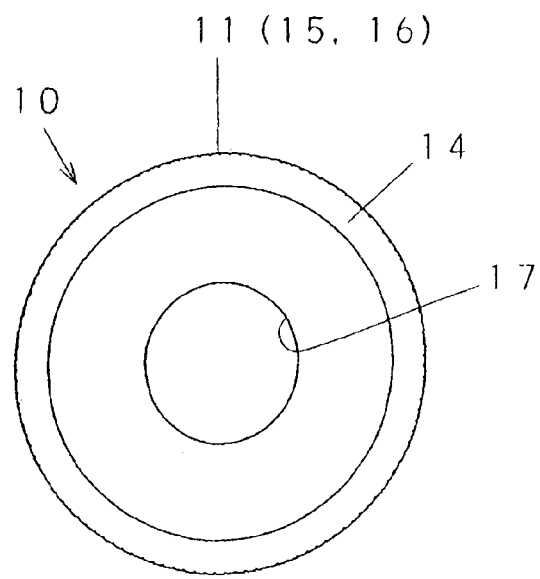
FIG. 2A is a side diagram showing the scribing wheel of FIG. 1.
Figure 2B:
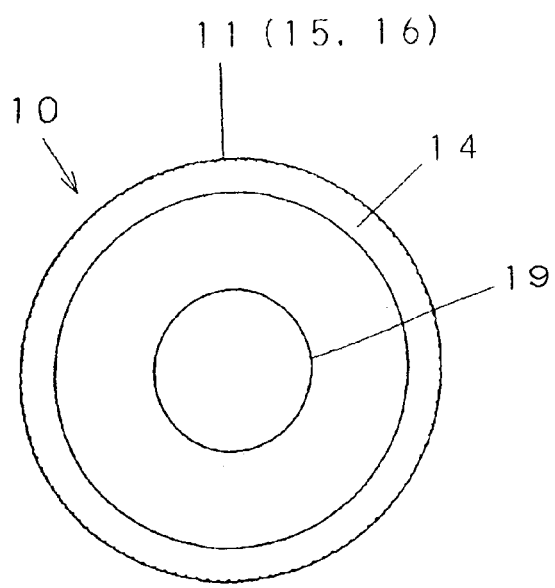
FIG. 2B is a side diagram showing an embodiment of the scribing wheel of FIG. 1 having an integrated pin.

The scribing wheel 10 according to an embodiment of the present invention is described in reference to FIGS. 1, 2A and 2B. FIG. 1 is a front diagram showing the scribing wheel 10 as viewed in the direction perpendicular to the rotational axis, and FIGS. 2A and 2B are side diagrams showing embodiments of the scribing wheel of FIG. 1.

Figure 7:
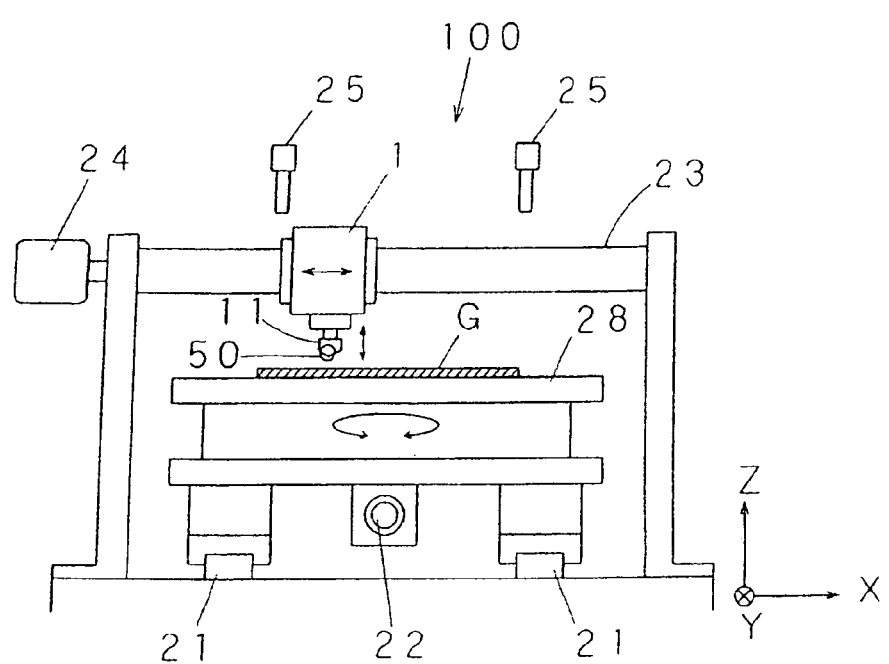
FIG. 7 is a front diagram showing a conventional scribing apparatus.

Here, the scribing wheel 10 according to the present invention is a scribing wheel for a brittle material with which a scribe line is drawn on a brittle material substrate, such as of glass, when rotated in such a state as to be pressed against the above described brittle material substrate so that a vertical extending in the direction of the thickness of the above described brittle material substrate from the scribe line is formed as the scribe line is drawn. The scribing wheel 10 according to the present invention can be mounted on, for example, a scribe head 1 of the conventional scribing apparatus 100 described in reference to FIG. 7, and thus replace the conventional scribing wheel 50.

As shown in FIGS. 1, 2A and 2B, the scribing wheel 10 has an outer peripheral portion 14 where a circumference ridgeline 11 is formed from two truncated cones sharing the same rotational axis 12 and of which the bottoms are connected, and a number of notches 15 and protrusions 16 which are formed along the above described circumference ridgeline 11 in the direction of the circumference.

The circumference ridgeline 11 is formed by carrying out a grinding process from the axial core outward in the direction of the radius, and thus, grinding streaks are left on the surface of the outer peripheral portion 14 on which the grinding process has been carried out. The outer peripheral portion 14 is formed in such a manner as to have a convergent angle (α).

Referring to FIG. 2A the scribing wheel 10 is a wheel in disc form having an axial hole 17 through which a pin for supporting the scribing wheel, not shown, passes. Referring to FIG. 2B a pin 19 is integrated with the scribing wheel 10 to support the wheel.

It is preferable for the material for the scribing wheel 10 to be a hard metal, sintered diamond, ceramic or cermet.

The outer peripheral portion 14 is formed of the inclined surfaces of the two truncated cones 13, and has grinding streaks which are left after the grinding process for forming the circumference ridgeline 11, and the process has been carried out so that the central line average roughness Ra on the above described inclined surfaces becomes 0.45 μm or less.

The grinding process is carried out so that the central line average roughness Ra becomes 0.45 μm or less, due to the grinding streaks left on the above described inclined surfaces, and therefore, the total amount of shaved material for forming the blade can be reduced in comparison with conventional grinding processes for providing a greater central line average roughness Ra, and as a result, protrusions 16 can be prevented from being wearing, so that the life is greatly prolonged.

The circumference ridgeline 11 has microscopic unevenness formed as a result of the above described grinding streaks on the inclined surfaces of the truncated cones 13 which form the outer peripheral portion 14, and the central line average roughness Ra on the above described unevenness is 0.40 μm or lower.

The grinding process is carried out so that the central line average roughness Ra on the unevenness of the circumference ridgeline 11 becomes 0.40 μm or less, and therefore, the height (position in direction of radius) of the circumference ridgeline 11 from which a process for notches 15 starts can be easily determined when notches 15 are formed along the circumference ridgeline 11.

Figure 3A:
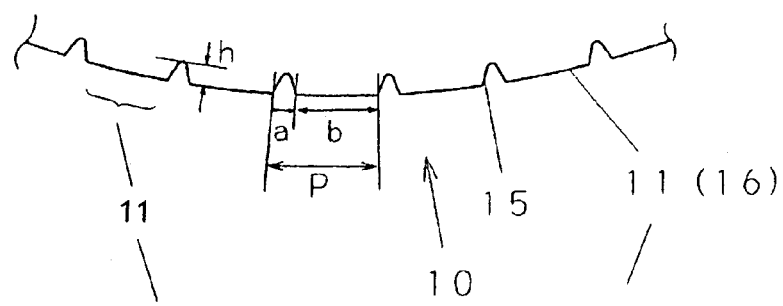
FIG. 3A is a diagram showing an enlarged portion of the wheel embodiments of FIGS. 2A and 2B according to one embodiment.
Figure 3B:
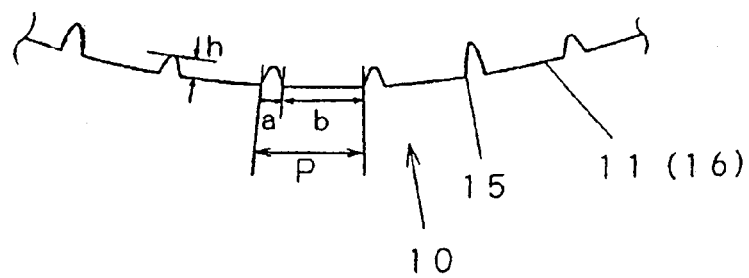
FIG. 3B is a diagram showing an enlarged portion of the wheel embodiments of FIGS. 2A and 2B according to another embodiment.
Figure 4:
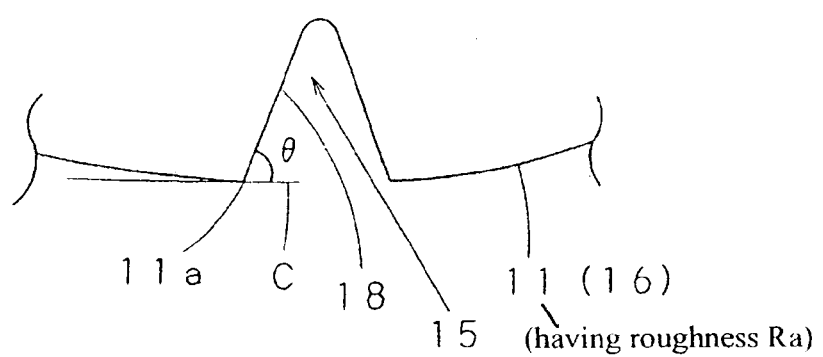
FIG. 4 is a diagram showing an enlarged portion of FIG. 3.

As shown in FIGS. 3A, 3B, and 4, which are diagrams showing an enlarged portion of embodiments shown in FIGS. 2A and 2B, the notches 15 of the scribing wheel 10 are formed with a pitch P. Also, a length a of the notches 15 in the direction of the circumference is shorter than a length b of the protrusions 16 in the direction of the circumference. The protrusions 16 are formed of the portions of the circumference ridgeline 11 which are left after the circumference ridgeline 11 has been notched, and have a length in the direction of the circumference.

The notches 15 are formed in the flat circumference ridgeline 11 by forming grooves in approximately V shape with a depth h with a pitch P. When these notches 15 are formed, protrusions 16 having a height h (corresponding to ridgeline portions 11) are formed in the circumference ridgeline 11 with a pitch P.

The portions of the protrusions 16 corresponding to the circumference ridgeline 11 have microscopic unevenness formed as a result of the above described grinding streaks on the inclined surfaces of the truncated cones 13, and the central line average roughness Ra on the above described unevenness is 0.40 μm or less.

As shown in FIG. 4, the notches 15 have notched surfaces 18 that have been formed inward in the direction of the radius in the bottom portion of the cribbing wheel 10, and tangent lines at the end portion 11a of the protrusions 16 cross the notched surface 18 at an angle (θ) of 30° to 60°.

That is to say, in the case where the tangent lines C at the end portion 11a of the protrusions 16 cross the notched surface 18 at a right angle or an angle close to a right angle, the bite of the protrusions 16 in the surface of a substrate at the end portion 11a becomes good, though the end portion 11a of the protrusions 16 wears out fast, while in the case where the tangent lines C at the end portion 11a of the protrusions 16 cross the notched surface 18 at an angle of 30° or smaller, the bite of the protrusions 16 in the surface of a substrate at the end portion 11a becomes poor.

When the range of the angle (θ) is between 30° and 60°, the bite of the scribing wheel in the surface of a substrate can be kept good while keeping the life of the scribing wheel 10 long.

The notches 15 are in approximately V shape as viewed in the direction of the axial line of the truncated cones 13, and therefore, the length a of the notches 15 in the direction of the circumference and length b of the protrusions in the direction of the circumference can be easily adjusted by changing the center angle in the V shape while securing depth for the notches 15 (height of the protrusions 16) h in this shape.

An example of the manufacturing method for the scribing wheel 10 is described below.

A columnar disc which becomes a parent body for the scribing wheel 10 is prepared and a grinding process is carried out on this columnar disc so that outer peripheral portions 14 are formed on both sides, and thus, a circumference ridgeline 11 where the inclined surfaces of two truncated cones 13 cross is formed. It is preferable for the surface roughness on the inclined surfaces of the truncated cones 13 and the undulation in the circumference ridgeline 11 in the axial direction originating from the surface roughness to be small during the above described grinding process.

The central line average roughness Ra on the inclined surfaces of the truncated cones 13 is 0.45 μm or less, and the circumference ridgeline 11 has microscopic unevenness formed as a result of the grinding streaks on the inclined surfaces of the truncated cones 13, and therefore, the size of the grains of the grindstone used is selected so that the central line average roughness Ra of the above described unevenness becomes 0.40 μm or less. Thus, the surface roughness on the inclined surfaces of the truncated cones 13 and the circumference ridgeline 11 is kept low, and as a result, the drawn scribe line keeps a small and constant width, and thus, chipping can be prevented on the divided surface of the glass substrate G after separation, which is achieved through scribing using the scribing wheel 10.

Next, notches 15 are formed in the circumference ridgeline 11.

As an example of how notches 15 are formed, notches in V shape as viewed in the direction of the axial line of the cones 13 are formed in the outer peripheral portion through irradiation with a laser beam.

According to this method, the length a of the notches 15 in the direction of the circumference and the length b of the protrusions 16 in the direction of the circumference can be easily adjusted while keeping the height h of the protrusions constant by changing the center angle in the V shape.

Appropriate specifications can be set for the scribing wheel, such as the outer diameter of the scribing wheel 10, the pitch P of the notches 15, the length a of the notches 15 in the direction of the circumference, the length b of the protrusions 16 in the direction of the circumference, the depth of the notches 15 and the convergent angle (α) in the outer peripheral portion 14, in accordance with the type, thickness and thermal history of the brittle material which is the object to be cut, and the quality desired for the cut surface of the brittle material. FIG. 3A shows a side view of a portion of a scribing wheel 10 having notches of the same depth. FIG. 3B shows a side view of a scribing wheel 10 having notches with differing depth.

As an example of the conditions for the scribing wheel, the outer diameter of the wheel is 1 mm to 20 mm, the pitch of the notches 15 is 20 μm to 5000 μm, the depth of the notches 15 is 0.5 μm to 5 μm, and the convergent angle of the circumference ridgeline 11 is 85° to 140°. As more preferable conditions for the scribing wheel, the outer diameter of the wheel is 1 mm to 5 mm, the pitch of the notches 15 is 20 μm to 50 μm, the depth of the notches 15 is 1 μm to 3 μm, and the convergent angle of the circumference ridgeline 11 is 100° to 130°.

In general, when a scribing wheel having deep notches is used, the catch on a brittle material (in particular, lower frequency of intersection skipping at the time of cross scribing) tends to be excellent, and it is preferable for the depth of the notches to be, for example, 2 μm to 3 μm, from the point of view of the catch in brittle materials. Meanwhile, when a scribing wheel having shallow notches is used, the quality on the divided surface (strength on the end surface) of the brittle material tends to increase, and it is preferable for the depth of the notches to be, for example, 1 μm to 2 μm, from the point of view of the strength on the end surface.

In general, when a scribing wheel having a short pitch between notches (a great number of divisions) is used, the catch in the brittle material tends to increase, and it is preferable for the pitch of the notches to be, for example, 20 μm to 1000 μm, from the point of view of the catch in brittle materials, and this is particularly appropriate in the case where a pasted glass substrate is divided. Meanwhile, when a scribing wheel having a long pitch between notches (a small number of divisions) is used, the quality on the divided surface (strength on the end surface) of the brittle material tends to increase, and this is preferable from the point of view of ease in the manufacture of the scribing wheel, and it is preferable for the pitch of the notches to be, for example, 1000 μm to 5000 μm, and this is particularly appropriate in the case where a material single plate (material plate) is divided.

In general, it is preferable to use a scribing wheel having a small outer diameter to divide a pasted glass substrate, and a scribing wheel having an outer diameter of 1 mm to 4 mm, for example, is appropriate. Meanwhile, it is preferable to use a scribing wheel having a large outer diameter to divide a material single plate, and a scribing wheel having an outer diameter of 4 mm to 20 mm, for example, is appropriate.

In general, scribing wheels having a wide convergent angle of the circumference ridgeline tend to have a long life, and it is preferable for the convergent angle of the circumference ridgeline to be, for example, 90 to 140°, from the point of view of lifetime, and 100° to 135° is particularly preferable.

In general, when a scribing where notches are long in the direction of the circumference is used, the catch in the brittle material tends to be good, and it is preferable for the length of the notches 15 in the direction of the circumference to be in a range from 4 μm to 14 μm, from the point of view of catch in brittle materials, and it is more preferable for it to be in a range from 7 μm to 12 μm. Meanwhile, when a scribing wheel where the notches are short in the direction of the circumference is used, the quality on the divided surface (strength on the end surface) of the brittle material tends to increase, and it is preferable for the length of the notches in the direction of the circumference to be in a range from 1 μm to 6 μm, from the point of view of quality on the divided surface of the brittle material, and it is more preferable for it to be in a range from 1 μm to 5 μm.

The scribing wheel (A blade) according to the present invention has the following excellent properties. The blade has good catch, and accordingly, intersection skipping does not occur at the time of cross scribing, and the blade is characterized in that even substrates which are too thin to adopt outer cutting scribing with an N blade can be handled, through inner cutting scribing.

A case where an A blade having such excellent properties is applied for cross scribing of a single plate is described in the following. A case where a single line or a number of scribe lines are drawn in a first direction using a first cutter wheel (first blade), and after that, a single line or a number of scribe lines are drawn in a second direction which crosses these using a second cutter wheel (second blade) is cited as an example.

In this case, the following combination becomes possible when selecting the first and second blades, though this depends on the quality and the thickness of the substrate which is the object to be process, as well as other factors.

|    | first blade | second blade |
|----|-------------|--------------|
| a) | N blade     | A blade      |
| b) | A blade     | A blade      |
| c) | A blade     | P blade      |

The above described cases a), b) and c) are characterized as follows.

The case of a) is a case where outer cutting scribing can be adopted, that is to say, the thickness of the substrate is, for example, 0.6 mm or greater, and a scribe line is drawn on a substrate which can be dealt with using an N blade when a scribe line is drawn in the first direction using an N blade, and after that, a scribe line is drawn in the second direction using an A blade.

The case of b) is a case where the substrate is thin, for example 0.4 mm or less, and good catch is provided, and it is important to secure strength on the end surface when a scribe line is drawn in the first direction using an A blade, and after that, a scribe line is drawn in the second direction using the same or a different A blade.

The case of c) is a case where the substrate is thin, for example 4 mm or less, and good catch is provided, and it is important to secure strength on the end surface, as in the above, when a scribe line is drawn in the first direction using an A blade, and after that, a scribe line is drawn in the second direction using a different P blade. In this case, a deep vertical crack is formed beneath the scribe line in the second direction, and as a result, effects are gained such that "splintering" and "chipping" can be prevented in the vicinity of intersections.

The following Table 1 shows the properties of a conventional scribing wheel (normal blade; blade without notches), the scribing wheel according to the present invention and a blade with high penetrability (blade where the length of grooves formed in the circumference ridgeline in the direction of the circumference is greater than the length of the protrusions in the direction of the circumference).

TABLE 1

|  | normal blade | present invention | blade with high penetrability |
|---|---|---|---|
| method for cutting | | | |
| outer-outer cutting *1 | possible | possible | possible |
| inner-inner cutting *2 | impossible | possible | possible |
| cut line skipping *3 | risk of occurrence | no occurrence | difficult to occur |
| intersection skipping *4 | risk of occurrence | no occurrence | difficult to occur |
| quality in intersection *5 | good | good | in some cases splintering, chipping or pinching may occur |
| strength on end surface | high | high | lower than other blades |
| ease of separation | breaking process required | breaking process required | manual separation possible |
| properties | ① risk of intersection skipping and cut line skipping occurring | ① no risk of cut line skipping or intersection skipping occurring ② high strength on | ① difficult for cut line skipping and intersection skipping to occur ② no breaking |

TABLE 1-continued

|  | normal blade | present invention | blade with high penetrability |
|---|---|---|---|
|  | ② high strength on end surface | end surface ③ cutting possible through inner cutting | required ③ good producibility |
| total evaluation | Δ | ◎ | ○ |

*1 cutting method for scribing from one end portion (edge) of a substrate to the other end portion
*2 cutting method for scribing from any location other than end portions on the surface of a substrate to another location (other than end portions)
*3 poor catch at time of outer-outer cutting (no rib mark formed)
*4 intersection skipping at time of cross cutting (no rib mark formed)
*5 difficult for splintering, chipping and pinching to occur The notches 15 are formed so that the surface at the bottom in the V shape becomes parallel to the axial line of the scribing wheel and the line connecting the deepest portions in the V shapes becomes parallel to the axial line of the scribing wheel.

The form on the bottom in the V shape of the notches 15 may be symmetrical or asymmetrical in the direction of the circumference when viewed in the direction of the axis line of the scribing wheel.

In the case where such a scribing wheel is used, intersection skipping can be prevented at the time of cross scribing, and stable conveyance becomes possible while preventing portions of the substrate from dropping during conveyance.

Figure 14:
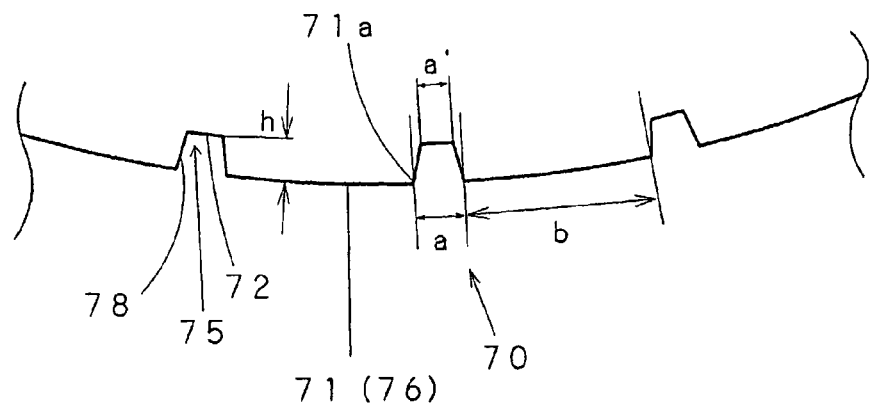
FIG. 14 is a diagram showing an enlarged portion of the circumference ridgeline of the scribing wheel according to another embodiment of the present invention.

As shown in FIG. 14, notches may be in approximately trapezoid form as viewed in the direction of the axis line of the rotational axis. In the case where the notches 75 in the scribing wheel 70 are trapezoids, as shown in FIG. 14, the length a of the notches 75 in the direction of the circumference and the length b of the protrusions 76 in the direction of the circumference can be easily adjusted while keeping the depth h of the notches 75 constant without changing the angle at which the tangent lines cross the surface 78 of the notches at the end portion 71a of the protrusion 76, by changing the length a' of the bottom side 72 of the trapezoids. Here, the bottom side 72 of the trapezoids of the notches 75 is regarded as a straight line for the sake of convenience, but it may be an arc.

Though the notches 75 are illustrated as being in approximately V shape or trapezoid form as viewed in the direction of the axial line of the rotational axis, the present invention is not particularly limited to this, and the notches may be in arc form or approximately U shape.

Figure 5:
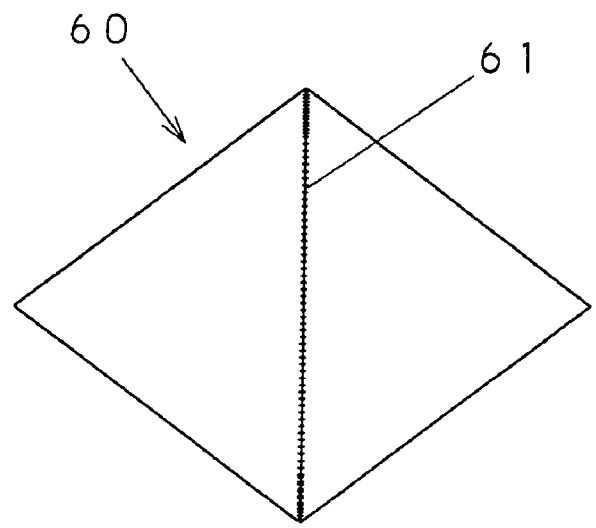
FIG. 5 is a front diagram showing the scribing wheel according to another embodiment of the present invention.

Though in the above described embodiment, a scribing wheel 10 in disc form having an axial hole through which a pin for supporting the scribing wheel passes is illustrated, the present invention includes an integrated type scribing wheel 60 where the pin is integrally formed as shown in FIG. 5.

The scribing wheel 60 has a great number of alternating notches 15 and protrusions 16 which are formed along the circumference ridgeline 61 in the direction of the circumference in the same manner as with the scribing wheel 10.

The scribing wheel 60 does not need a pin as does the scribing wheel 10, and therefore, has high precision in rotation with low sliding resistance, and therefore, stable rotation can be achieved, making the life of the blade long.

Figure 6:
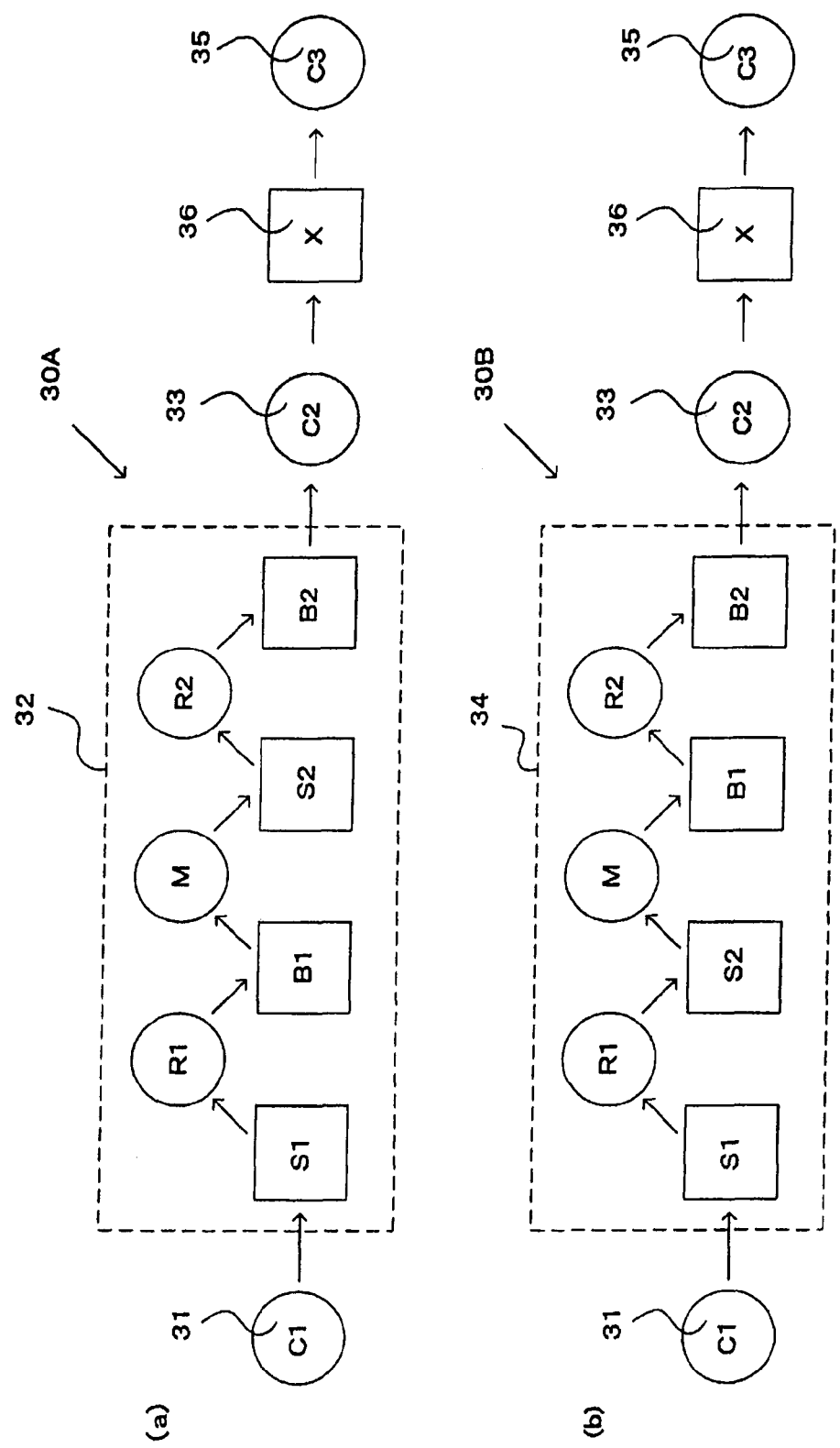
FIG. 6 is a diagram for illustrating an example of the configuration of a conventional liquid crystal panel dividing line where the scribing wheel according to the present invention is used.

FIG. 6 is a diagram for illustrating production lines 30A and 30B for dividing liquid crystal panels, including a scribing apparatus on which the scribing wheel 10 according to the present invention is mounted.

Figure 8:
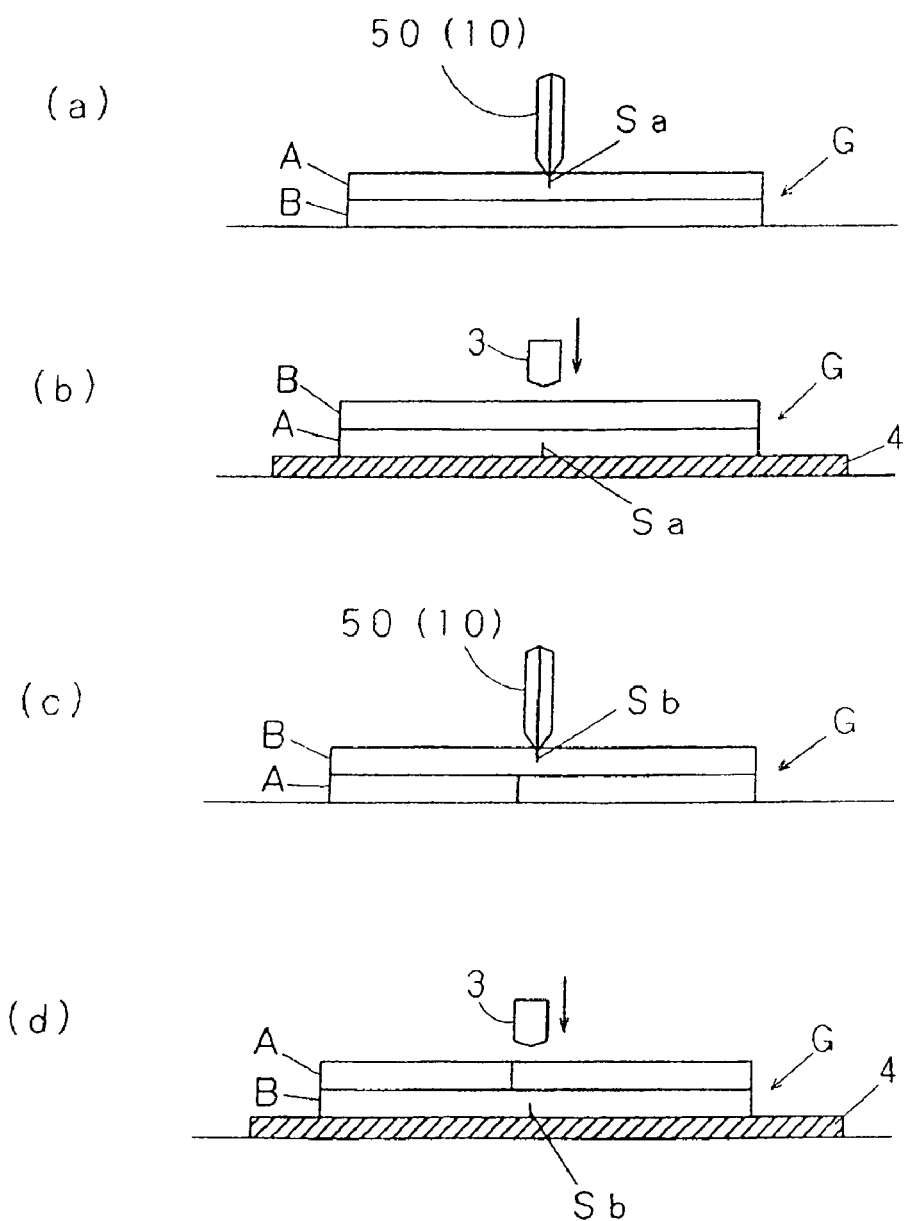
FIG. 8 is a diagram illustrating the steps of drawing a scribe line on the surface of a glass substrate in accordance with a conventional SBSB method and dividing the glass substrate along the drawn scribe line.

FIG. 6(a) shows a production line 30A for dividing liquid crystal panels in which the SBSB method shown in FIG. 8 is used, and which is formed of a liquid crystal panel dividing apparatus 32, a surface rounding apparatus 36 and conveying robots 31, 33 and 35, which are respectively provided between these apparatuses.

The liquid crystal panel dividing apparatus 32 is formed of scribing apparatuses S (S1, S2), breaking apparatuses B (B1, B2), turning and conveying robots R1 and R2 for turning glass substrates G upside down and conveying them, and a conveying robot M for conveying glass substrates G without turning them over.

Figure 9:
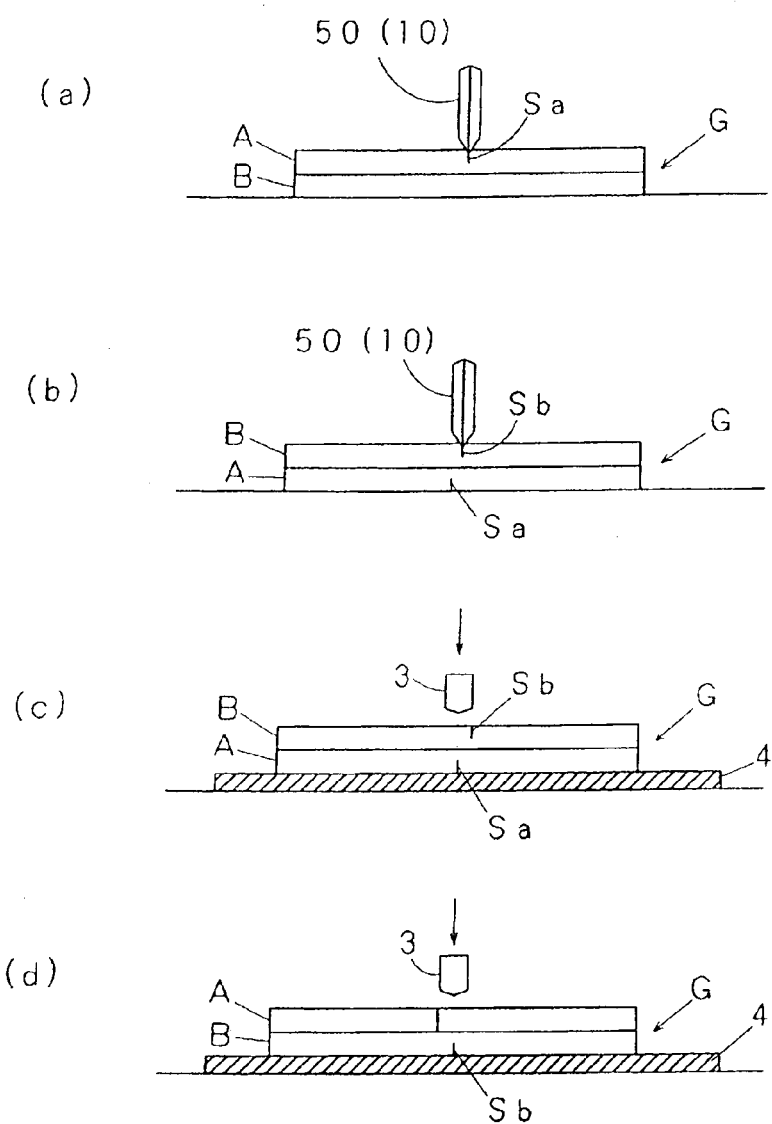
FIG. 9 is a diagram illustrating the steps of drawing a scribe line on the surface of a glass substrate in accordance with a conventional SSBB method and dividing the glass substrate along the drawn scribe line.
Figure 10:
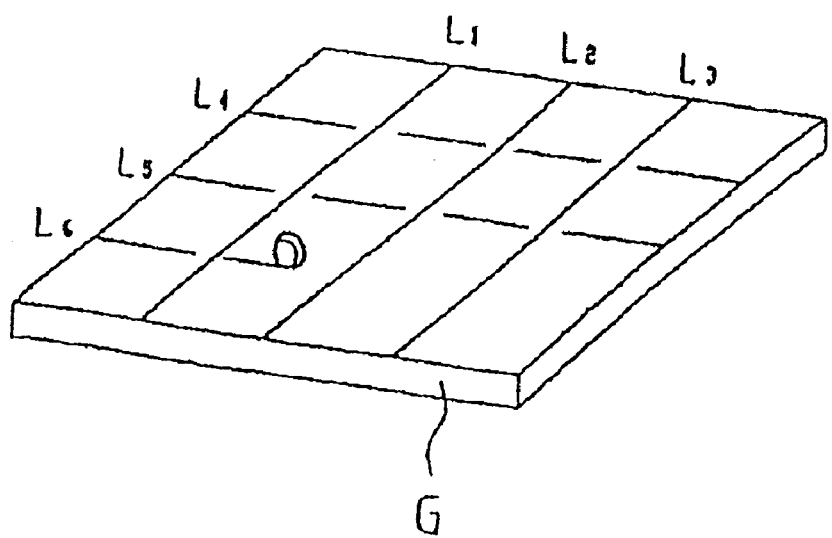
FIG. 10 is a perspective diagram illustrating a phenomenon where intersection skipping occurs when cross scribing is carried out.
Figure 11:
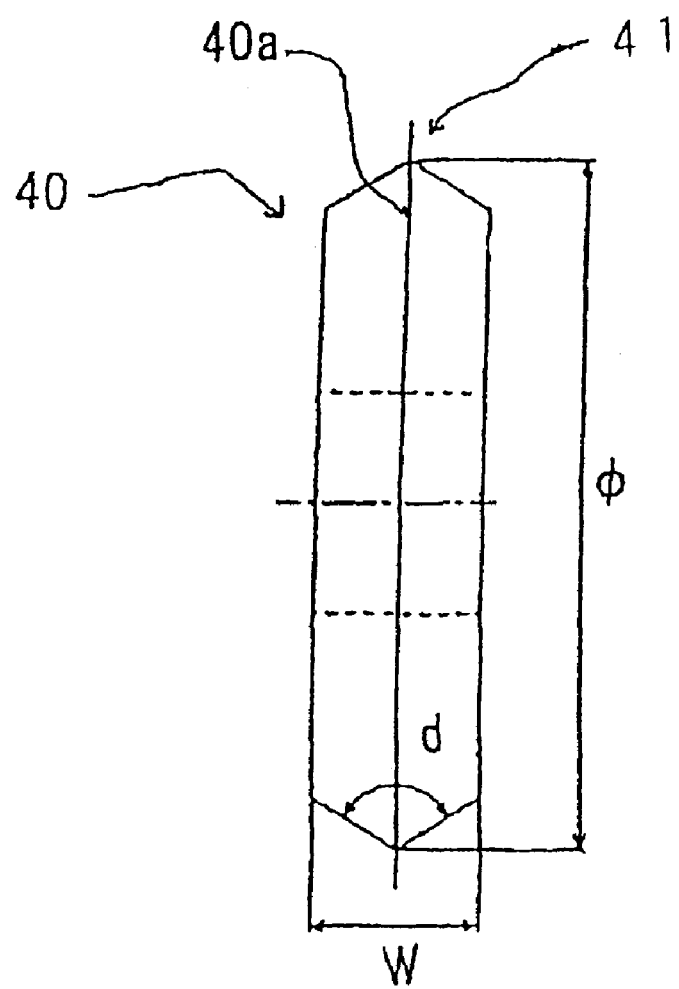
FIG. 11 is a front diagram showing a conventional scribing wheel as viewed in the direction perpendicular to the rotational axis.
Figure 12:
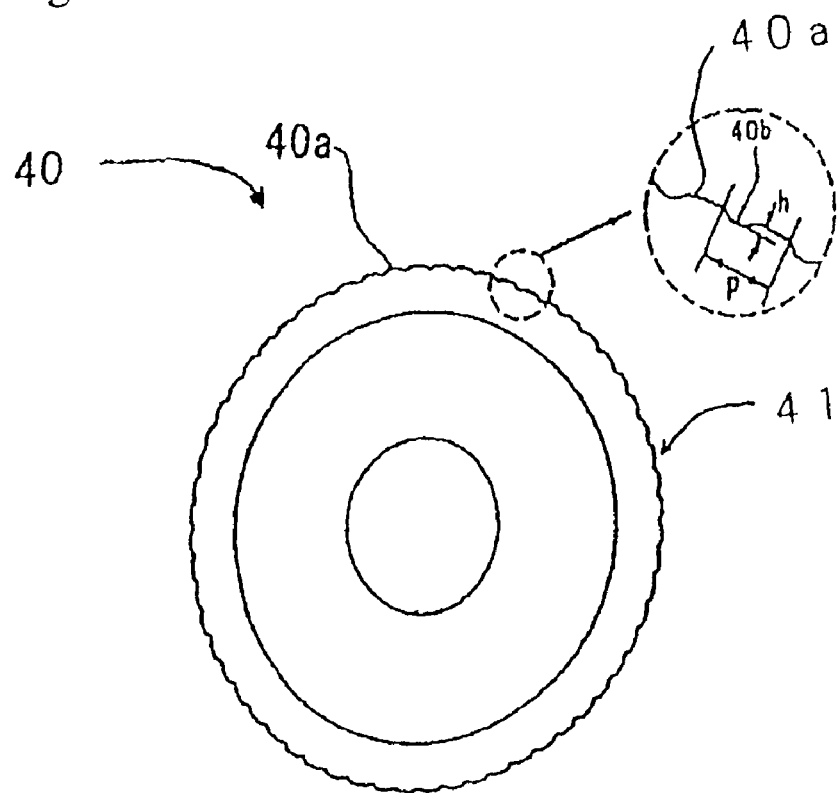
FIG. 12 is a side diagram showing the scribing wheel of FIG. 11.

FIG. 6(b) shows a production line 30B in which the SSBB method shown in FIG. 9 is used, and which is formed of a liquid crystal panel dividing apparatus 34, a surface rounding apparatus 36 and conveying robots 31, 33 and 35, which are respectively provided between these apparatuses.

The liquid crystal panel dividing apparatus 34 is formed of scribing apparatuses S (S1, S2), breaking apparatuses B (B1, B2), turning and conveying robots R1 and R2 for conveying glass substrates G, and a conveying robot M.

The respective scribing apparatuses S1 and S2 are provided with (1) a first scribe head on which a chip holder to which a scribing wheel can be attached (portion for attaching scribing wheel) is mounted, and which is formed so as to be moveable in the direction of the X axis, and (2) a second scribe head on which a chip holder to which a scribing wheel can be attached is mounted, and which is formed so as to be moveable in the direction of the Y axis.

The scribing wheel 10 according to this invention is mounted on the first scribe head via a chip holder, and the scribing wheel 10 according to this invention or a scribing wheel 40 having high penetrability is mounted on the second scribe head via a chip holder.

When a pasted substrate is cut using the above described respective scribing apparatuses S1 and S2, first, a first scribe line is drawn so as to extend in the direction of the X axis using the scribing wheel 10 of the first scribe head according to the present invention, and then, a second scribe line is drawn so as to extend in the direction of the Y axis and perpendicularly cross the first scribe line using the scribing wheel of the second scribe head. In the case where the scribing wheel 40 having high penetrability is mounted on the second scribe head, intersection skipping can be prevented without the scribing being affected by the type, thickness and thermal history of the glass by using the high penetrability of the scribing wheel 40.

In addition, in the case where the scribing wheels 10 according to the present invention are mounted on both the first and second scribe heads, the scribing wheels 10 of this invention draw precise scribe lines while preventing slipping on the surface of the glass substrate G, and thus, intersection skipping can be prevented to a significantly higher degree in comparison with the prior art, while securing safety during conveyance, and a divided surface having good quality can be gained even at intersections during cross scribing.

Furthermore, as a test, perpendicular scribe lines which are drawn on a glass substrate G using the scribing wheels 10 according to this invention which are mounted both on the second and first scribe heads, and after that, in the case where it is found that the glass substrate G cannot be appropriately separated along the scribe lines, due to insufficient division in some locations of the glass substrate G during the breaking process, scribe lines may be drawn using the scribing wheel 40 having high penetrability for the scribing operation in the crossing direction.

As for the locations where cutting of the glass substrate G tends to become insufficient, portions where there is a sealing material can be cited as an example. The sealing material is provided in order to paste two sheets of glass and to seal liquid crystal which is injected between the pasted glass plates.

Next, a "top and bottom dividing apparatus" for dividing the two sides of a pasted substrate simultaneously from above and below is described below. Apparatuses where a single blade or a number of blades are attached to the respective chip holders of the top and bottom scribe heads, which move on the surface of the top and bottom substrates, and thus, the process for dividing a pasted substrate is simplified, have started being introduced into mass production lines for FPD panels. When blades with high penetrability (P blades) are used as the blades attached to the above described top and bottom chip holders, the following advantages are gained.

In the case where the top and bottom substrates are scribed with a P blade, it becomes possible to simplify or omit the breaking process after scribing. It is possible to separate the scribed top and bottom substrates in accordance with, for example, the following three methods.

1) The top and bottom substrates are scribed with a P blade, and after that, the top and bottom substrates are pulled away to the left and right with slight force, and thus, the top and bottom pasted substrates are separated to the left and right.

2) The top and bottom substrates are scribed with a P blade, and after that, the top and bottom substrates are slightly bent, and at the same time, pulled away to the left and right, and thus, the top and bottom pasted substrates are separated to the left and right.

3) The top and bottom substrates are scribed with a P blade, and after that, a pressing roller made of an elastic material is rolled over the surface of the substrate in the portions immediately after drawing of the scribe lines, and thus, the top and bottom substrates become of such a state as to be separated to the left and right at the point in time when the scribing operation is completed.

In terms of this top and bottom dividing apparatus, the top substrate is scribed with a P blade while the bottom substrate is scribed with an A blade instead of a P blade, and portions of the substrate can be prevented from dropping while the substrate is being conveyed.

In addition, depending on the application for the pasted substrate, in some cases, it may become necessary to carry out respective cross scribing operations on the top and bottom substrates in the top and bottom dividing apparatus. In such a case also, the scribing operation is carried out in the first direction using the first blade, and after that, the scribing operation is carried out in the second direction using the second blade. In this case, it is possible to use the same type of blade for the first and second blades, or conversely, to use different types of blades.

In the case where the scribing operation in two directions, first and second, using the same type of blade, that is, the A blade, for example, is carried out, it is sometimes difficult to separate a narrow portion of the substrate which corresponds to a terminal portion through a normal breaking operation. In such a case, it becomes possible to take out a portion of the substrate which is a narrow terminal portion from the middle of the substrate (removal operation from the middle) through an simple breaking operation, by carrying out the scribing operation in the first direction using an A blade and carrying out the scribing operation in the crossing second direction using a P blade.

In addition, the present invention includes a manual scribing tool where the scribing wheel 10 for a brittle material according to the present invention is attached to a holder provided at the end of a handle in such a manner as to be rotatable around the axis.

Figure 13:
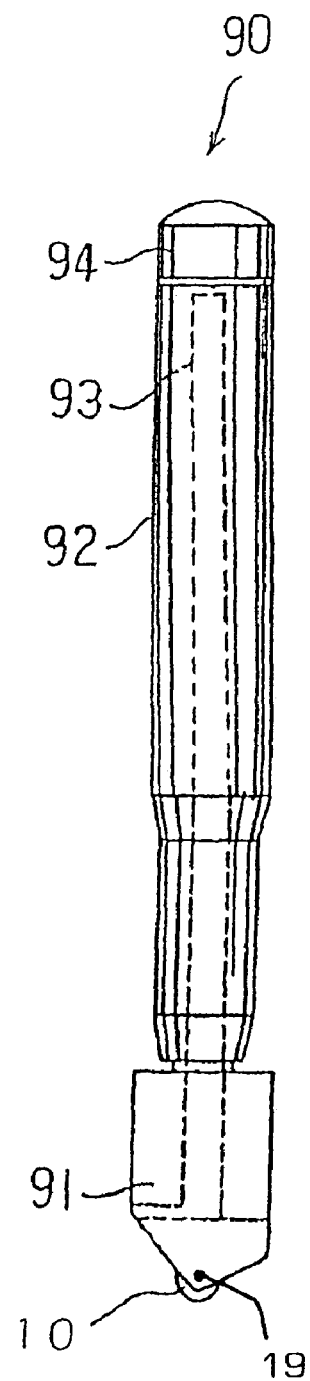
FIG. 13 is a front diagram showing the manual scribing tool according to the present invention.

FIG. 13 is s front diagram showing the above described manual scribing tool.

A manual scribing tool 90 is formed mainly of a holder 91 on which a scribing wheel 10 is mounted at one end in such a manner as to be replaceable, and a handle 92 in rod form from which the holder 91 is removable.

An oil chamber 93 is formed inside the handle 92, one end of the handle 92 forms a connection portion with the holder 91, and the other end is provided with a cap 94 which is removable so that a lubricant can be supplied into the oil chamber 93.

Though in the above described embodiment, irradiation with a laser is used to form notches 15, manufacture through a grinding process and a discharge process is also included in the present invention, taking the quality of the material of the scribing wheel and the efficiency of processing into consideration.

Furthermore, the scribing apparatuses, the respective scribing apparatuses S1 and S2, according to the present invention include multi-head scribing apparatuses which are provided with a first scribe head group on which chip holders of which the number is the same as that of the above described discs to which a number of scribing wheels can be attached is mounted and which is formed in such a manner as to be moveable in the direction of the X axis and a second scribe head group on which chip holders of which the number is the same as that of the above described discs to which a number of scribing wheels can be attached is mounted and which is formed in such a manner as to be moveable in the direction of the Y axis so that a number of scribe lines can be drawn on a brittle material substrate when the respective scribe heads are moved in the direction of each axis.

Furthermore, the scribing apparatuses according to the present invention also include multi-head scribing apparatuses which are provided with first and second scribe heads where a number of chip holders as those described above are mounted on each scribe head so that a number of scribe lines can be drawn on a brittle material substrate when the respective scribe heads are moved in each direction; that is, in the direction of X and Y axis.

Though in the above described best mode for carrying out the invention, scribing of a pasted glass substrate for a liquid crystal display panel is described, the object of scribing is not limited to a pasted glass substrate according to the present invention, and in terms of the glass, one sheet of glass may also be the object of scribing according to the present invention. In addition, brittle materials other than glass (for example semiconductor materials, such as silicon, sapphire and the like) may also be the object of scribing according to the present invention.

Here, the depth h of the respective notches 15 formed in the scribing wheel 10 for a brittle material according to the present invention may not be constant, and the depth h of the notches may be different, so that the depth is 3, 1, 1 . . . 3, 1, 1 in the direction of the circumference, for example.

EXAMPLES

Scribe lines were drawn (cross scribing), three each longitudinally and laterally with intervals of 100 mm on a glass substrate 1 (non-alkaline glass substrate; thickness: 0.7 mm) and a glass substrate 2 (highly hard glass substrate for LCD; thickness: 0.63 mm) using the scribing wheel (A blade (A-wheel)) according to the present invention, a conventional normal blade (N blade (N-wheel)) and a conventional blade with high penetrability (P blade (P-wheel)), and the substrates were broken along the scribe lines so that test pieces (100 mm×100 mm) were gained (SSBB method). The bending strength of each test piece was measured. In terms of the bending strength, pressure was applied to the glass substrate in the vertical direction along two straight lines, each of which was at a distance of 50 mm from the center line (line for dividing the test piece in two with a size of 100 mm×50 mm) on one side (front surface) of each test piece, on either side, and along two straight lines, each of which was at a distance of 10 mm from the center line (line facing the center line on the front surface) on the other side (rear surface) of each test piece, on either side, and the pressure (stress) when the test piece broke was measured. Every combination of the above described three types of scribing wheels and the above described two types of glass substrates was measured 50 to 100 times, and the results of measurement were statistically processed on the basis of the Weibull distribution. The results for the glass substrate 1 are shown in FIG. 15, and the results for the glass substrate 2 are shown in FIG. 16.

Figure 15:
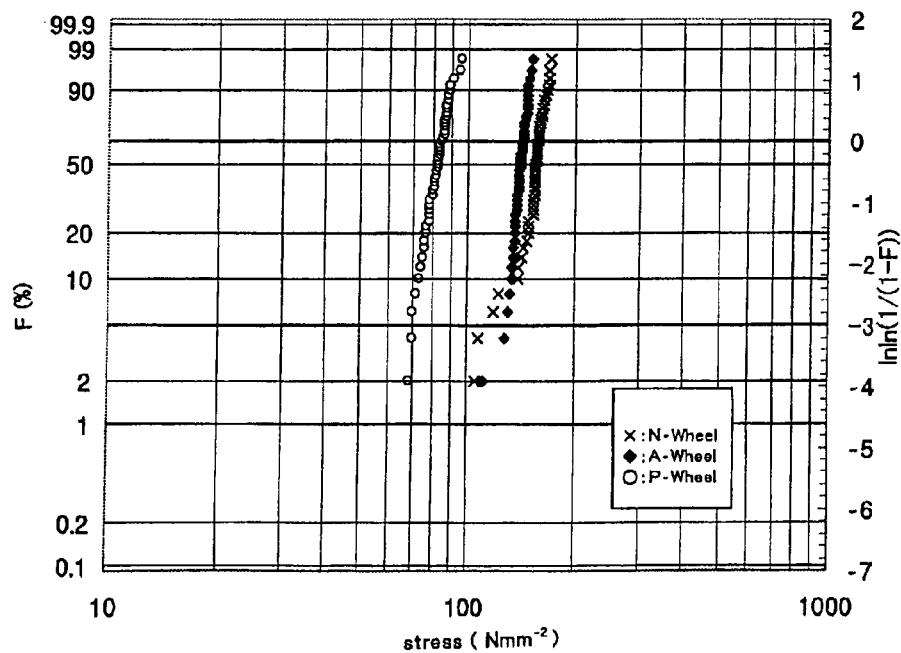
FIG. 15 is a graph showing the results of testing [Weibull distribution (F) of bending strength] for an example (A blade) of the present invention and comparative examples (N blade, P blade) for the glass substrate 1.
Figure 16:
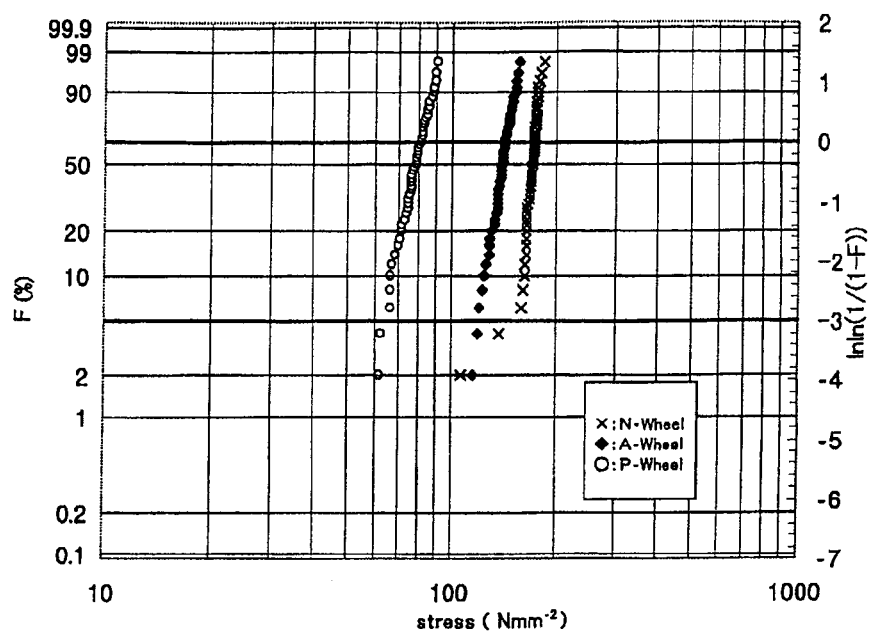
FIG. 16 is a graph showing the results of testing [Weibull distribution (F) of bending strength] for an example (A blade) of the present invention and comparative examples (N blade, P blade) for the glass substrate 2.

It can be seen from the results shown in FIGS. 15 and 16 that the test pieces divided using the scribing wheel according to the present invention (A blade) had the same properties in terms of the bending strength as the test pieces divided using the conventional normal blade (N blade), and better properties in terms of the bending strength than the test pieces divided using the conventional blade with high penetrability (P blade). This is because the quality on the end surface of the test pieces divided using the scribing wheel (A blade) according to the present invention was high.

INDUSTRIAL APPLICABILITY

The present invention can provide a scribing wheel for a brittle material which can prevent intersection skipping in the case where cross scribing is carried out when a fragile material substrate is cut, and prevent portions of the substrate from dropping while the substrate is conveyed, thus making stable conveyance possible. In addition, the present invention can provide a scribing wheel for a brittle material which makes the quality on the divided surface (strength on the end surface) of a brittle material substrate high.

The present invention is particularly effective for glass substrates made of non-alkaline glass and crystal glass, and can be applied to various types of brittle material substrates for various types of flat display panels, for which TFT liquid crystal panel, TN liquid crystal panels and STN liquid crystal panels can be cited as typical examples.

The invention claimed is:
1. A scribing wheel for a brittle material, comprising:
an outer peripheral portion around which a circumference ridgeline is formed, where two truncated cones have connected bottoms so as to share a common rotational axis; and
a number of alternating notches and protrusions which are formed in the direction of the circumference along said circumference ridgeline,
wherein said protrusions are formed of portions of said circumference ridgeline which remain after said circumference ridge line is notched and have a length in the direction of the circumference so that a scribe line is drawn on said brittle material substrate and a vertical crack extending from the scribe line in the direction of the thickness of a brittle material substrate is formed when the scribing wheel is rotated in such a state as to be pressed against said brittle material substrate,
wherein a length of said notches in the direction of the circumference is shorter than the length of said protrusions in the direction of the circumference, and
wherein said outer peripheral portion is formed in such a manner as to include inclined surfaces of said two cones, and a central line average roughness Ra of said inclined surfaces is 0.45 µm or less.

2. The scribing wheel for a brittle material according to claim 1, wherein the length of said notches in the direction of the circumference is a range from 4 m to 14 m.

3. The scribing wheel for a brittle material according to claim 1, wherein the central line average roughness Ra of said circumference ridgeline is 0.40 m or less.

4. The scribing wheel for a brittle material according to claim 1, wherein the scribing wheel for a brittle material is an integrated type wheel which has a hole for an axis through which a pin for supporting said wheel around the axis or is formed integrally with said pin.

5. The scribing wheel for a brittle material according to claim 1, wherein said number of notches are formed in the direction of the circumference around the entire periphery of said circumference ridgeline with different depths.

6. The scribing wheel for a brittle material according to claim 1, wherein said notches are formed around the entire periphery of said circumference ridge line with a pitch of 20 m to 5000 m, and the depth of said notches is 0.5 m to 3.0 m.

7. A manual tool for scribing a brittle material, wherein the scribing wheel for a brittle material according to any of claims 1, 2, 3, 4, 5 and 6 is attached to a holder provided at an end of a handle in such a manner as to be freely rotatable around the axis.

8. An apparatus for scribing a brittle material, comprising: a rotatable table on which a brittle material substrate is mounted; a portion for attachment of a scribing wheel which moves in both X and Y directions relative to the brittle material substrate mounted on said table; and a scribing wheel for a brittle material according to any of claims 1, 2, 3, and 4, which is attached to said portion for attachment of a scribing wheel.

9. A method for scribing a brittle material according to which a scribing wheel for a brittle material is rotated in such a state as to be pressed against a brittle material substrate so that a scribe line is drawn on said brittle material substrate, characterized in that a first scribe line is drawn using a first scribing wheel for a brittle material, and then, a second scribe line which crosses the drawn first scribe line is drawn using a second scribing wheel for a brittle material, and at least the first scribing wheel for a brittle material is the scribing wheel for a brittle material according to any of claims 1, 2, 3 and 4.

* * * * *

UNITED STATES PATENT AND TRADEMARK OFFICE
CERTIFICATE OF CORRECTION

| | |
|---|---|
| PATENT NO. | : 7,975,589 B2 |
| APPLICATION NO. | : 11/988193 |
| DATED | : July 12, 2011 |
| INVENTOR(S) | : Kazuya Maekawa et al. |

Page 1 of 1

It is certified that error appears in the above-identified patent and that said Letters Patent is hereby corrected as shown below:

Col. 20, Claim 2 line 3, Claim 3 line 3, and Claim 6 line 4, for the symbol "m" each occurrence should read --μm--.

Signed and Sealed this
Twenty-second Day of November, 2011

David J. Kappos
*Director of the United States Patent and Trademark Office*

UNITED STATES PATENT AND TRADEMARK OFFICE
CERTIFICATE OF CORRECTION

PATENT NO.         : 7,975,589 B2                                      Page 1 of 1
APPLICATION NO.    : 11/988193
DATED              : July 12, 2011
INVENTOR(S)        : Kazuya Maekawa et al.

It is certified that error appears in the above-identified patent and that said Letters Patent is hereby corrected as shown below:

Column 20, line 17 (Claim 2, line 3) for the symbol "m" each occurrence should read --μm--.

Column 20, line 20 (Claim 3, line 3) for the symbol "m" each occurrence should read --μm--.

Column 20, line 33 (Claim 6, line 4) for the symbol "m" each occurrence should read --μm--.

This certificate supersedes the Certificate of Correction issued November 22, 2011.

Signed and Sealed this
Third Day of January, 2012

David J. Kappos
*Director of the United States Patent and Trademark Office*